(12) United States Patent
Nishimachi (10) Patent No.: US 12,027,995 B2
(45) Date of Patent: Jul. 2, 2024

(54) POWER CONVERTER

(71) Applicant: DENSO CORPORATION, Kariya (JP)

(72) Inventor: Seiichiro Nishimachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 180 days.

(21) Appl. No.: 17/860,509

(22) Filed: Jul. 8, 2022

(65) Prior Publication Data

US 2022/0345052 A1   Oct. 27, 2022

Related U.S. Application Data

(63) Continuation of application No. PCT/JP2020/046524, filed on Dec. 14, 2020.

(30) Foreign Application Priority Data

Feb. 7, 2020 (JP) ................ 2020-019908

(51) Int. Cl.
*H02M 7/5387* (2007.01)
*B60K 6/26* (2007.10)
*B60K 6/28* (2007.10)
*H02P 27/08* (2006.01)

(52) U.S. Cl.
CPC ........ *H02M 7/53871* (2013.01); *H02P 27/08* (2013.01); *B60K 6/26* (2013.01); *B60K 6/28* (2013.01); *B60Y 2200/92* (2013.01); *B60Y 2400/61* (2013.01)

(58) Field of Classification Search
CPC ... H02M 7/53871; H02M 3/003; H02P 27/08; B60K 6/26; B60K 6/28; B60K 6/445; B60Y 2200/92; B60Y 2400/61; H02K 11/33
USPC ................ 318/139, 400.26, 400.01, 700
See application file for complete search history.

(56) References Cited

U.S. PATENT DOCUMENTS 7,589,481 B2 * 9/2009 Sonoda ............. H02M 7/003
318/400.26

FOREIGN PATENT DOCUMENTS

JP    2009-286326 A    12/2009

* cited by examiner

*Primary Examiner* — David Luo
(74) *Attorney, Agent, or Firm* — Oliff PLC (57) ABSTRACT

A power converter includes a rectangular casing that houses a semiconductor module, and bosses extending outward from three of four side walls of the casing excluding a rear side wall. The bosses include a first boss provided on a first side wall facing frontward, a second boss provided on a second side wall facing in a width direction of the mobile object orthogonal to an up-down direction and a front-rear direction, and a third boss provided on a third side wall opposite to the second side wall. The third boss is smaller in cross-sectional area than the second boss.

5 Claims, 6 Drawing Sheets

POWER CONVERTER

CROSS REFERENCE TO RELATED APPLICATIONS

The present application is a continuation application of International Patent Application No. PCT/JP2020/046524 filed on Dec. 14, 2020, which designated the U.S. and claims the benefit of priority from Japanese Patent Application No. 2020-019908 filed on Feb. 7, 2020. The entire disclosures of all of the above applications are incorporated herein by reference.

TECHNICAL FIELD

The present disclosure relates to a power converter.

BACKGROUND

A power converter is disposed in a mobile object and includes a rectangular casing having four side walls, and each side wall has a boss extending outward to be fixed to the mobile object.

SUMMARY

According to at least one embodiment of the present disclosure, a power converter is disposed in a housing chamber of a rotating electrical machine in a mobile object and performs power conversion between a battery of the mobile object and the rotating electrical machine. The power converter includes a semiconductor module, a casing and bosses. The semiconductor module forms a circuit for the power conversion. The casing has a rectangular shape in top view in an up-down direction of the mobile object and houses the semiconductor module. The bosses extend outward, respectively, from three of four side walls of the casing excluding a side wall provided on a side of the casing facing rearward in a front-rear direction of the mobile object orthogonal to the up-down direction. The bosses are fixed to the mobile object. The bosses include a first boss provided on a first side wall facing frontward, a second boss provided on a second side wall facing in a width direction of the mobile object orthogonal to the up-down direction and the front-rear direction, and a third boss provided on a third side wall opposite to the second side wall. A cross-sectional area of the third boss perpendicular to an extending direction of the third boss is smaller than a cross-sectional area of the second boss perpendicular to an extending direction of the second boss.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Contents of JP 2009-286326 A are incorporated by reference as descriptions of technical elements in this specification.

To begin with, examples of relevant techniques will be described. According to a comparative example, a case of a power converter has a rectangular shape in top view in an up-down direction of a vehicle. Each of the four side walls (side surfaces) of the rectangle is provided with a boss which is a fixing part fixed to the vehicle. Therefore, shock of a collision is applied to the power converter.

According to an aspect of the present disclosure, a power converter is disposed in a housing chamber of a rotating electrical machine in a mobile object and performs power conversion between a battery of the mobile object and the rotating electrical machine. The power converter includes a semiconductor module, a casing and bosses. The semiconductor module forms a circuit for the power conversion. The casing has a rectangular shape in top view in an up-down direction of the mobile object and houses the semiconductor module. The bosses extend outward, respectively, from three of four side walls of the casing excluding a side wall provided on a side of the casing facing rearward in a front-rear direction of the mobile object orthogonal to the up-down direction. The bosses are fixed to the mobile object.

The bosses include a first boss provided on a first side wall facing frontward, a second boss provided on a second side wall facing in a width direction of the mobile object orthogonal to the up-down direction and the front-rear direction, and a third boss provided on a third side wall opposite to the second side wall. A cross-sectional area of the third boss perpendicular to an extending direction of the third boss is smaller than a cross-sectional area of the second boss perpendicular to an extending direction of the second boss.

In this power converter, the bosses are provided on the three side walls excluding the side wall facing rearward. Since there is no boss on the side wall facing rearward, the casing can move rearward at a time of frontal collision, and shock of the collision can be reduced. One boss (third boss) provided on a side of the casing in the width direction is made smaller in cross-sectional area than the other boss (second boss) provided on an opposite side of the casing in the width direction. As a result, when such a frontal collision occurs, the third boss is broken, and the casing rotates about the fixing point of the second boss. Therefore, shock of the collision can be mitigated. As described above, the power converter can deliver a high shock mitigation performance.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

A plurality of embodiments will be described with reference to the drawings. In the plurality of embodiments, functionally and/or structurally corresponding parts are denoted by the same reference numerals. A PCU described below can be applied to a mobile object using a rotating electrical machine as a drive source. The mobile object is, for example, an electrically powered vehicle such as an electric vehicle (EV), a hybrid vehicle (HV), or a fuel cell vehicle (FCV), a flying body such as a drone, a ship, a construction machine, or an agricultural machine. Hereinafter, an example of a vehicle (hybrid vehicle) will be described as the mobile object.

First Embodiment

Hereinafter, in the front-rear direction of the vehicle, a direction from the rear side to the front side is referred to as a front direction, and a direction from the front side to the rear side is referred to as a rear direction. In the width direction of the vehicle, that is, the left-right direction, a direction from the left side to the right side is referred to as a right direction, and a direction from the right side to the left side is referred to as a left direction. In the up-down direction of the vehicle, a direction from the lower side to the upper side is referred to as an upward direction, and a direction from the upper side to the lower side is referred to as a downward direction. The front-rear direction, the left-right direction, and the up-down direction are orthogonal to one another. First, a schematic configuration of a vehicle will be described with reference to FIG. 1.

Figure 1:
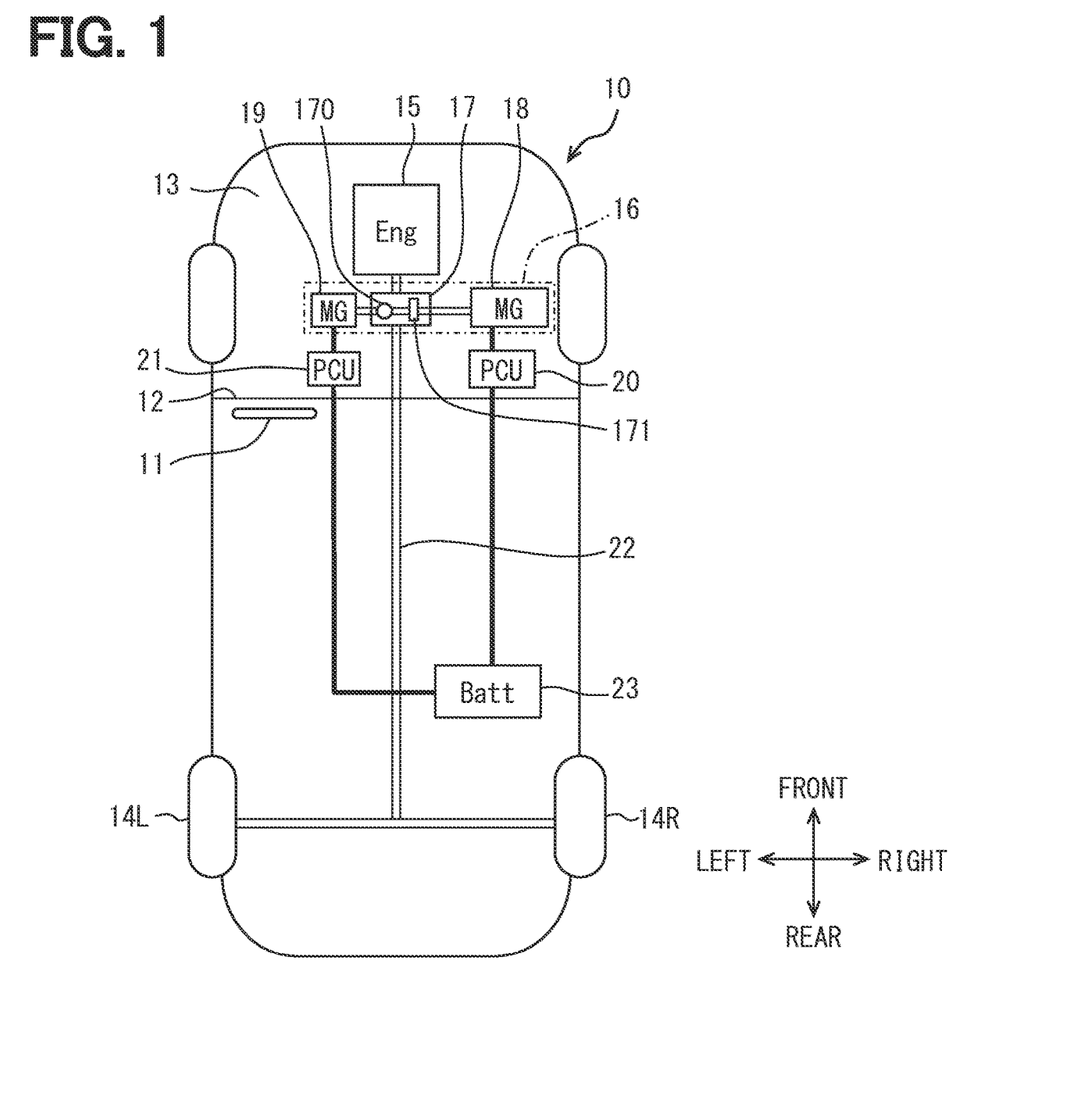
FIG. 1 is a diagram illustrating a schematic configuration of a vehicle.

A vehicle 10 illustrated in FIG. 1 is a hybrid vehicle of a front engine rear wheel drive (FR) system. The vehicle 10 has a steering wheel 11, that is, a driver's seat, on the left side in the vehicle compartment. The vehicle 10 includes, in a front compartment 13 partitioned from the vehicle compartment by a partition wall 12, an engine 15 used to drive the rear wheels 14R and 14L, a transmission 16, a power control unit 20, and the like. The engine 15 may be referred to as an internal combustion engine. The front compartment 13 may be referred to as an engine compartment or an engine room. Hereinafter, the power control unit is referred to as a PCU. The front compartment 13 corresponds to a housing chamber.

The transmission 16 includes a gear device 17, a motor generator 18 mainly functioning as an electric motor, and a motor generator 19 mainly functioning as a generator. The motor generators 18 and 19 are three-phase alternating current rotating electrical machines. Both of the motor generators 18 and 19 can operate as a generator or an electric motor. The vehicle 10 is capable of travel using at least one of the engine 15 and the motor generator 18 as a drive source. The motor generator 18 functions as a generator during regeneration.

The gear device 17 includes a power dividing mechanism 170 and a reduction mechanism 171. Each of the power dividing mechanism 170 and the reduction mechanism 171 is mainly configured by a planetary gear, for example. The power dividing mechanism 170 connects the engine 15, the motor generator 18, and the motor generator 19 to each other. A rotation shaft of the motor generator 18 is connected to the power dividing mechanism 170.

The reduction mechanism 171 is connected to a rotation shaft of the motor generator 18. The rotation shaft of the motor generator 18 is connected to the rear wheels 14R and 14L, which are drive wheels, via the reduction mechanism 171, a propeller shaft 22, a differential (not illustrated), and the like. The rotation shaft of the motor generator 18 is connected to a crankshaft of the engine 15 via the power dividing mechanism 170.

The power dividing mechanism 170 distributes the power of the engine 15 to the motor generator 19 and the rotation shaft of the motor generator 18. That is, power of the engine 15 is distributed to power generation and driving. The motor generator 19 functions as a starter (electric motor) that starts the engine 15 by rotating a crankshaft of the engine 15 via the power dividing mechanism 170. The reduction mechanism 171 decelerates power output from at least one of the engine 15 and the motor generator 18 at a predetermined reduction ratio and outputs the power.

The PCU 20 is disposed between a battery 23 and the motor generator 18. The battery 23 is disposed behind the partition wall 12 in the vehicle 10. The battery 23 is a DC voltage source including a chargeable/dischargeable secondary battery such as a lithium ion battery or a nickel hydrogen battery. The PCU 20 performs power conversion between the battery 23 and the motor generator 18. The PCU 20 converts the DC voltage of the battery 23 into a three-phase AC voltage and outputs the three-phase AC voltage to the motor generator 18. The PCU 20 converts the three-phase AC voltage generated by the motor generator 18 into a DC voltage at the time of regenerative braking of the vehicle.

The vehicle 10 further includes a PCU 21 provided separately from the PCU 20. The PCU 21 performs power conversion between the battery 23 and the motor generator 19. The PCU 21 converts the three-phase AC voltage generated by the motor generator 19 into a DC voltage and outputs the DC voltage to the battery 23 side. The PCU 21 converts a DC voltage of the battery 23 into a three-phase AC voltage at the time of starting of the engine 15, and outputs the three-phase AC voltage to the motor generator 19. As a result, the motor generator 19 is driven to rotate the crankshaft of the engine 15.

The PCUs 20 and 21 are disposed in the vicinity of the partition wall 12 in the front compartment 13. In particular, the PCU 20 is disposed in the vicinity of a side surface of the vehicle 10 in the left-right direction, specifically, in the vicinity of the right side surface. The PCU 20 is disposed in the vicinity of a right side member (not illustrated). The PCU 20 is disposed on a side opposite to the steering wheel 11 (driver's seat) in the left-right direction. The motor generator 18 and the engine 15 are disposed in front of the PCU 20. The motor generator 18 corresponds to a rotating electrical machine of a mobile object, and the PCU 20 corresponds to a power converter.

In FIG. 1, for convenience, the gear device 17 and the motor generators 18 and 19 included in the transmission 16 are illustrated side by side in the left-right direction. However, the present invention is not limited to this arrangement. The components may be arranged in the front-rear direction. For example, the motor generator 19, the power dividing mechanism 170, the motor generator 18, and the reduction mechanism 171 may be arranged in this order from the front side of the vehicle.

Figure 2:
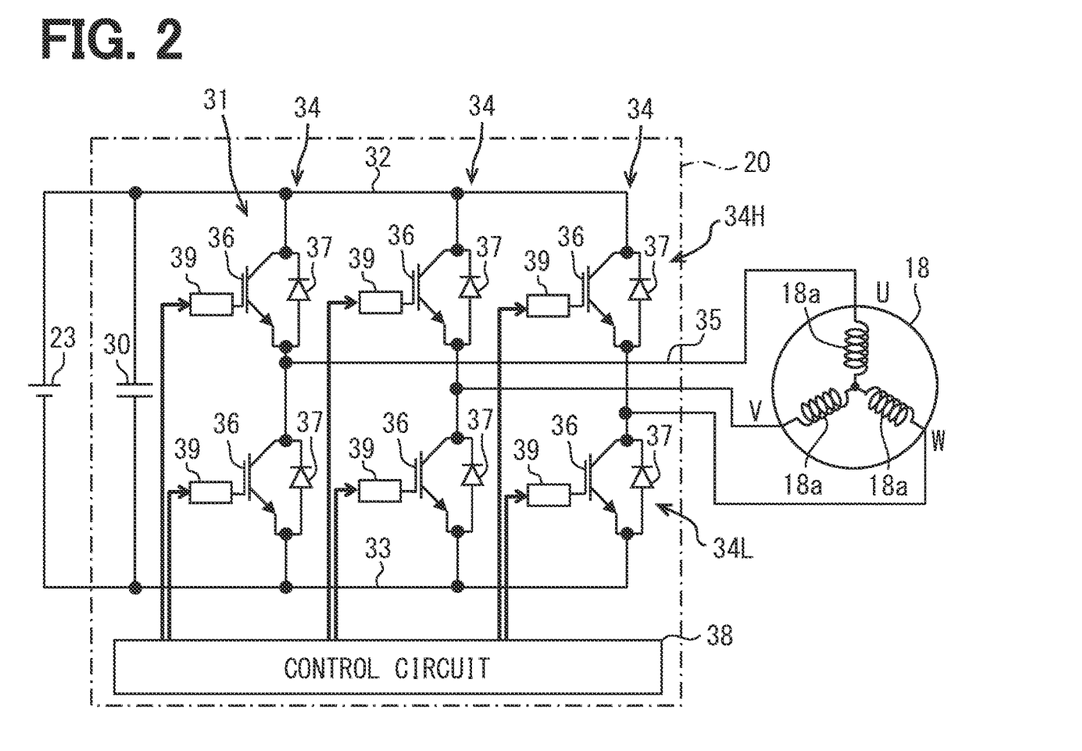
FIG. 2 is a diagram illustrating a circuit configuration of a PCU.

Next, a circuit configuration of the PCU 20 will be described with reference to FIG. 2. The PCU 20 includes a smoothing capacitor 30, an inverter 31, a control circuit 38, and a drive circuit 39.

The smoothing capacitor 30 mainly smooths the DC voltage supplied from the battery 23. The smoothing capacitor 30 is connected between a P line 32 which is a power line on the high potential side and an N line 33 which is a power line on the low potential side. The P line 32 is connected to the positive electrode of the battery 23, and the N line 33 is connected to the negative electrode of the battery 23. The positive electrode of the smoothing capacitor 30 is connected to the P line 32 between the battery 23 and the inverter 31. Similarly, the negative electrode of the smoothing capacitor 30 is connected to the N line 33 between the battery 23 and the inverter 31.

The inverter 31 is a DC-AC conversion circuit. The inverter 31 includes upper and lower arm circuits 34 for three phases. The upper and lower arm circuits 34 may be referred to as legs. Each of the upper and lower arm circuits 34 includes an upper arm 34H and a lower arm 34L. The upper arm 34H and the lower arm 34L are connected in series between the P line 32 and the N line 33 with the upper arm 34H on the P line 32 side. The connection point between the upper arm 34H and the lower arm 34L is connected to a winding 18a of the corresponding phase in the motor generator 18 via an output line 35. The inverter 31 has six arms (34H, 34L).

Each arm includes an n-channel IGBT 36 as a switching element and a diode 37. The diode 37 is connected in anti-parallel to the IGBT 36 for reflux. In the upper arm 34H, the collector of the IGBT 36 is connected to the P line 32. In the lower arm 34L, the emitter of the IGBT 36 is connected to the N line 33. The emitter of the IGBT 36 in the upper arm 34H and the collector of the IGBT 36 in the lower arm 34L are connected to each other. The anode of the diode 37 is connected to the emitter of the corresponding IGBT 36, and the cathode is connected to the collector of the corresponding IGBT 36.

The inverter 31 converts a DC voltage into a three-phase AC voltage according to switching control by the control circuit 38, and outputs the three-phase AC voltage to the motor generator 18. As a result, the motor generator 18 is driven to generate a predetermined torque. At the time of regenerative braking of the vehicle, the inverter 31 converts a three-phase AC voltage generated by the motor generator 18 by receiving a rotational force from a drive wheel (rear wheel 14R, 14L) into a DC voltage according to switching control by the control circuit 38, and outputs the DC voltage to the P line 32. In this manner, the inverter 31 performs bidirectional power conversion between the battery 23 and the motor generator 18.

The control circuit 38 generates a drive command for operating the IGBT 36 and outputs the drive command to the drive circuit 39. The control circuit 38 generates a drive command on the basis of a torque request input from a host ECU (not illustrated) and signals detected by various sensors. Examples of the various sensors include a current sensor, a rotation angle sensor, and a voltage sensor. The current sensor detects a phase current flowing through the winding 18a of each phase. The rotation angle sensor detects a rotation angle of a rotor of the motor generator 18. The voltage sensor detects a voltage the across smoothing capacitor 30. The PCU 20 includes these sensors (not illustrated).

The control circuit 38 outputs, for example, a PWM signal as a drive command. The control circuit 38 includes, for example, a microcomputer. ECU is an abbreviation for electronic control unit. PWM is an abbreviation for pulse width modulation.

The drive circuit 39 supplies a drive voltage to the gate of the IGBT 36 of the corresponding arm on the basis of the drive command of the control circuit 38. The drive circuit 39 drives, that is, turns on and off the corresponding IGBT 36 by applying the drive voltage. The drive circuit 39 may be referred to as a driver. In the present embodiment, one drive circuit 39 is provided for one arm.

The PCU 20 may further include a converter as a power conversion circuit. The converter is a DC-DC conversion circuit that converts a DC voltage into a DC voltage having a different value. The converter is provided between the battery 23 and the smoothing capacitor 30. The converter includes, for example, a reactor and the upper and lower arm circuit 34 described above. The PCU 20 may further include a filter capacitor that removes power supply noise from the battery 23. The filter capacitor is provided between the battery 23 and the converter.

An example in which the PCU 20 includes the control circuit 38 has been described, but the present invention is not limited thereto. For example, by providing the function of the control circuit 38 to the host ECU, the control circuit 38 may be omitted. An example in which the drive circuit 39 is provided for each arm has been described, but the present invention is not limited thereto. For example, one drive circuit 39 may be provided for one upper and lower arm circuit 34. The PCU 21 has a configuration similar to that of the PCU 20.

Figure 3:
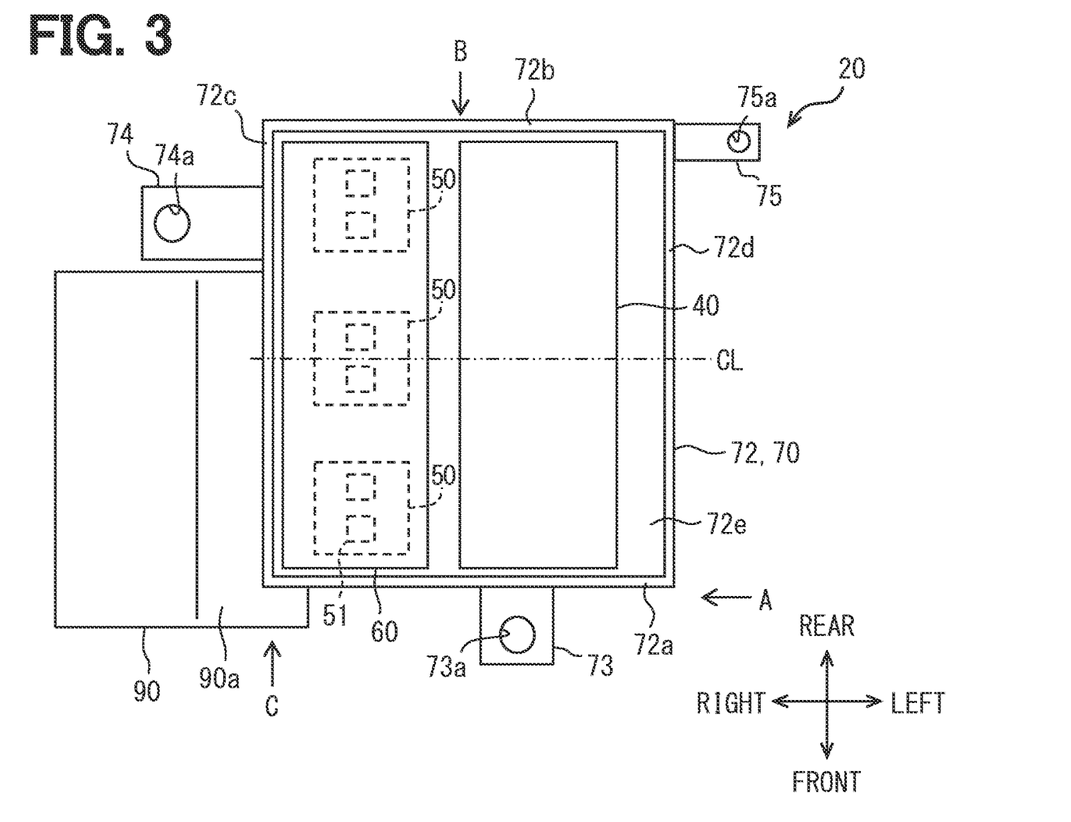
FIG. 3 is a top view illustrating a PCU according to a first embodiment.
Figure 4:
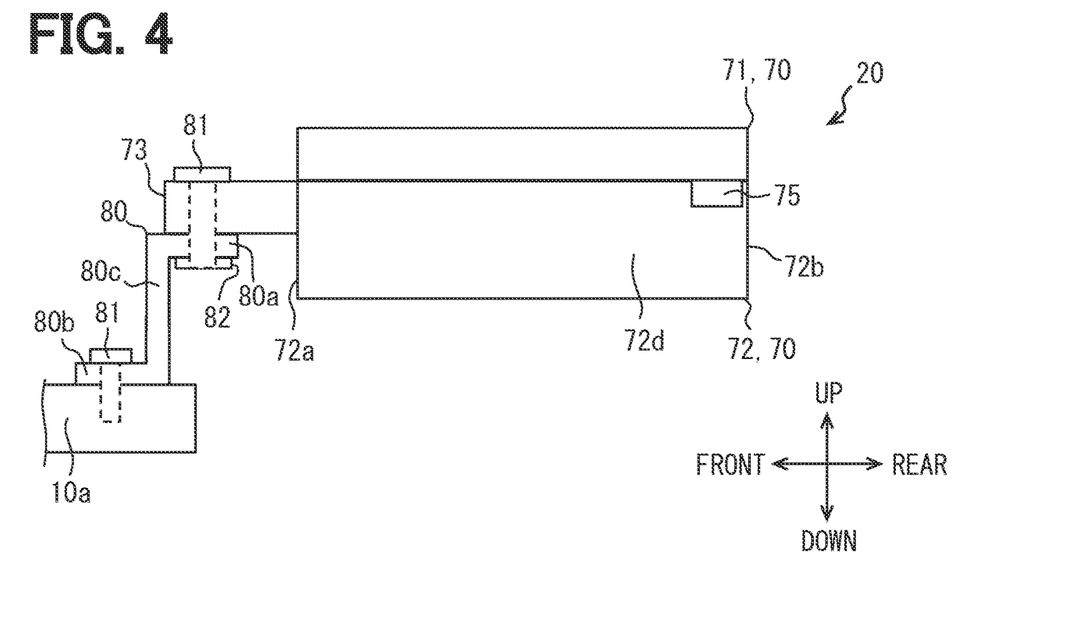
FIG. 4 is a side view of FIG. 3 as viewed in direction A.
Figure 5:
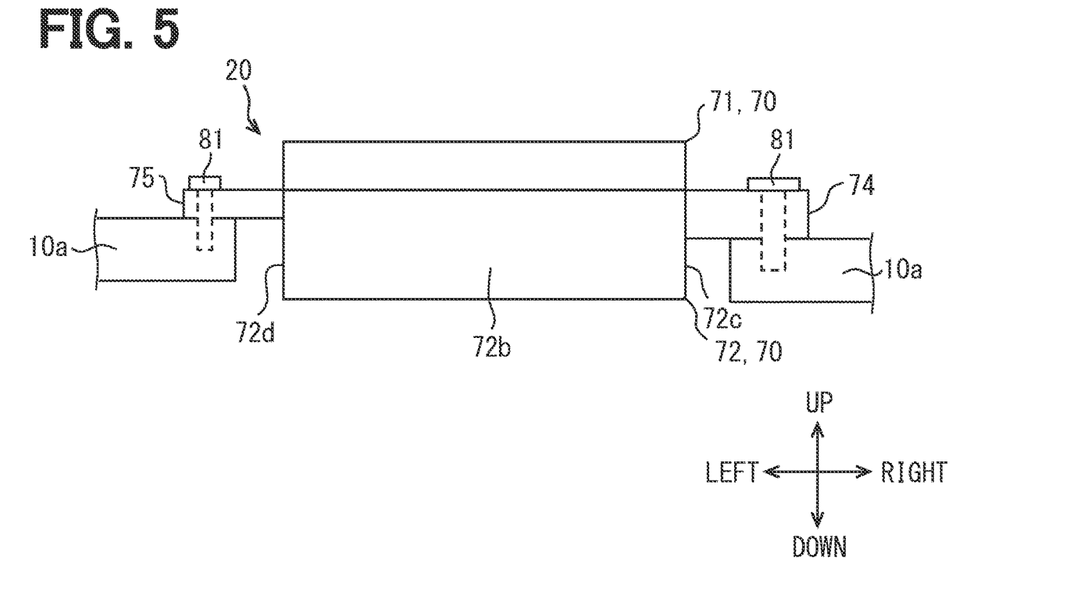
FIG. 5 is a side view of FIG. 3 as viewed in direction B.
Figure 6:
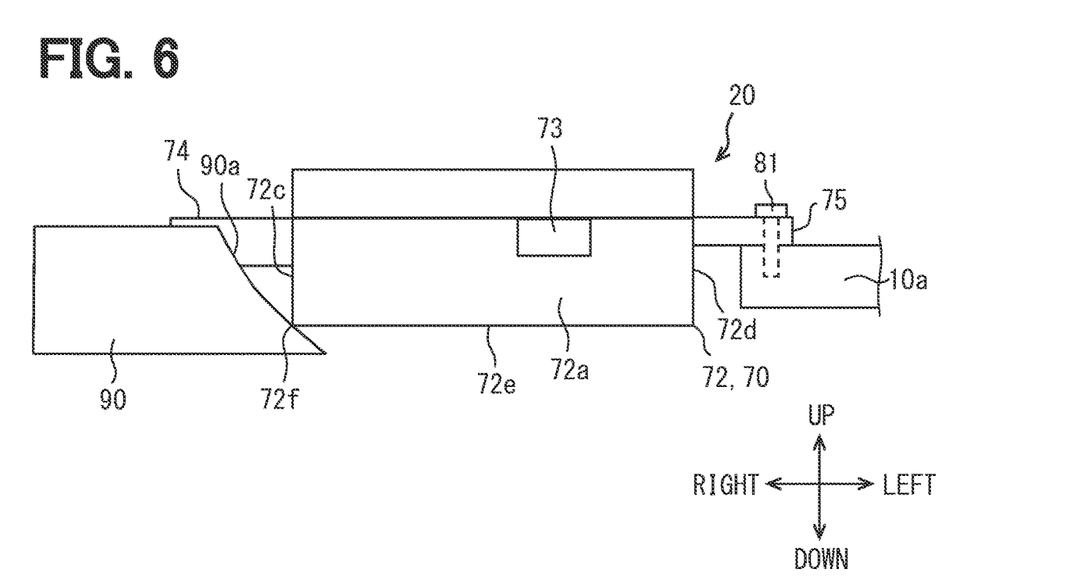
FIG. 6 is a side view of FIG. 3 as viewed in direction C.

Next, a structure of the PCU 20 and a fixing structure (mounting structure) of the PCU 20 will be described with reference to FIGS. 3, 4, 5, and 6. In FIG. 3, an upper case 71 is omitted to show elements housed in a casing 70. In FIG. 3, for convenience, a bracket 80, a bolt 81, and a vehicle body 10a are omitted. FIG. 4 is a side view of the PCU 20 as viewed in direction A illustrated in FIG. 3, and FIG. 5 is a side view of the PCU 20 as viewed in direction B illustrated in FIG. 3. FIG. 6 is a side view of the PCU 20 as viewed in direction C illustrated in FIG. 3.

The PCU 20 includes a capacitor module 40, a semiconductor module 50, a circuit board 60, the casing 70, the bracket 80, and an inclined member 90. The PCU 20 further includes a bus bar, an input terminal block, an output terminal block, and the like (not illustrated). Hereinafter, unless otherwise specified, a shape in top view as viewed in the up-down direction of the vehicle 10, in other words, a shape along a plane defined by the front-rear direction and the left-right direction is simply referred to as a planar shape.

The capacitor module 40 is included in a capacitor of the PCU 20. The capacitor module 40 is included in the smoothing capacitor 30. The capacitor module 40 includes a capacitor case, a capacitor element, a sealing resin body, and a terminal (not illustrated). At least one capacitor element is disposed (housed) in the capacitor case. The capacitor element is, for example, a film capacitor element. The sealing resin body is disposed in the capacitor case so as to seal the capacitor element. The terminal is a plate-shaped metal member connected to a metal electrode of the capacitor element, and a part thereof protrudes outward from the sealing resin body. The capacitor module 40 has a terminal on the positive electrode side and a terminal on the negative electrode side. The terminal is connected to an input terminal block (connector) for connecting to the battery 23 via a bus bar.

The semiconductor module 50 is included in a power conversion circuit of the PCU 20. The semiconductor module 50 is included in the inverter 31. The PCU 20 includes three semiconductor modules 50. The three semiconductor modules 50 are arranged in the front-rear direction. One semiconductor module 50 forms an upper and lower arm circuit 34 for one phase. Each of the semiconductor modules 50 includes two semiconductor elements 51. In the semiconductor element 51, the IGBT 36 and the diode 37 described above are formed on a semiconductor substrate made of silicon (Si), silicon carbide (SiC), gallium nitride (GaN), or the like. A reverse conducting (RC)-IGBT is formed in the semiconductor element 51. The two semiconductor elements 51 are integrally sealed by the sealing resin body. The sealing resin body has a substantially rectangular planar shape.

The semiconductor module 50 includes a plurality of external connection terminals (not illustrated). The external connection terminal includes a main terminal and a signal terminal. A P terminal, which is one of the main terminals, is electrically connected to the collector of the semiconductor element 51 included in the upper arm 34H. An N terminal, which is another one of the main terminals, is electrically connected to the emitter of the semiconductor element 51 included in the lower arm 34L. An output terminal, which is another one of the main terminals, is electrically connected to a connection point between the upper arm 34H and the lower arm 34L. The signal terminal is electrically connected to a pad of the semiconductor element 51.

The main terminal and the signal terminal protrude outward from opposite surfaces of the sealing resin body. The main terminal protrudes outward from the left side surface, and the signal terminal protrudes outward from the right side surface. The three main terminals are arranged in the front-rear direction. The P terminal and the N terminal are connected to a terminal of the capacitor module 40 via a bus bar (not illustrated). The output terminal is connected to an output terminal block (connector) for connecting to the winding 18a of the motor generator 18 via a bus bar. The protruding part of the signal terminal has a bent part, and the tip end side extends upward.

The circuit board 60 includes a wiring board, an electronic component, and a connector (not illustrated). The wiring of the wiring board and the electronic component mounted on the wiring board form a circuit. The control circuit 38 and the drive circuit 39 described above are formed on the circuit board 60. The circuit board 60 is disposed so as to overlap the three semiconductor modules 50 in top view. The circuit board 60 includes the three semiconductor modules 50. The circuit board 60 is disposed above the semiconductor module 50. Signal terminals of the semiconductor modules 50 are inserted and mounted on the circuit board 60.

Structures of the semiconductor module 50 and the circuit board 60 are arranged next to the capacitor module 40 in the left-right direction. The structures are disposed on the right side, and the capacitor module 40 is disposed on the left side.

The casing 70 houses and protects other elements included in the PCU 20, specifically, the capacitor module 40, the semiconductor module 50, the circuit board 60, a bus bar (not illustrated), and the like. The casing 70 is formed in a box shape using a metal material. The casing 70 is, for example, a molded body formed by aluminum die casting. The casing 70 is dividable in the up-down direction of the vehicle 10. The casing 70 includes the upper case 71 and a lower case 72. The casing 70 is formed by assembling the upper case 71 and the lower case 72 to each other. The casing 70 has a substantially rectangular shape in top view. The inner space of the casing 70 is sealed in a liquid-tight manner, for example, by interposing a sealing material (not illustrated) on the opening edges of the upper case 71 and the lower case 72.

The upper case 71 has a box shape with one surface opened. The lower case 72 also has a box shape with one surface opened. The bottom wall of the lower case 72 has a substantially rectangular shape in top view. The lower case 72 has four side walls 72a, 72b, 72c, and 72d. The side walls 72a to 72d form four rectangular side surfaces. The side wall 72a (first side wall) faces frontward in the vehicle 10, and the side wall 72b (second side wall) faces rearward in the vehicle 10. The side wall 72c (third side wall) faces rightward in the vehicle 10, and the side wall 72d (fourth side wall) faces leftward in the vehicle 10. As described above, the PCU 20 is disposed in the vicinity of the right side surface of the vehicle 10. The side wall 72c is closer to the outside of the vehicle 10, that is, the right side surface of the vehicle 10, than the side wall 72d in the left-right direction (width direction).

The structures and capacitor module 40 described above are disposed in the lower case 72. The capacitor module 40 and the semiconductor module 50 are fixed to the lower case 72, for example. The semiconductor module 50 is disposed on a bottom wall 72e of the lower case 72, and the circuit board 60 is disposed above the semiconductor module 50.

In the casing 70, bosses 73, 74, and 75 are provided on three side walls 72a, 72c, and 72d excluding the side wall 72b. The bosses 73, 74, and 75 are parts for fixing the casing 70, and therefore the PCU 20, to the vehicle body 10a. The bosses 73, 74, and 75 extend outward from the casing 70 (lower case 72) at positions near the open end of the lower case 72. The bosses 73, 74, and 75 are formed integrally with the lower case 72.

The boss 73 extends to the front side of the vehicle 10 from the side wall 72a. The boss 73 corresponds to a first boss. The boss 73 is provided to the left of the center of the casing 70 (lower case 72) in the left-right direction. As illustrated in FIG. 4, the boss 73 is fixed to the vehicle body 10a via the bracket 80.

The bracket 80 is a metal plate. The bracket 80 has a substantially crank-like shape in top view as viewed in the left-right direction. A substantially L-shaped bracket 80 may be employed. The bracket 80 includes fixing parts 80a and 80b and a connecting part 80c. The fixing part 80a is provided at one end of the bracket 80 in the extending direction, and the fixing part 80b is provided at the other end of the bracket 80 in the extending direction. The connecting part 80c connects the two fixing parts 80a and 80b. The plate thickness direction of the fixing parts 80a and 80b is substantially parallel to the up-down direction, and the plate thickness direction of the connecting part 80c is substantially parallel to the front-rear direction.

The boss 73 has a through hole 73a through which the bolt 81 is inserted. The through hole 73a penetrates the boss 73 in the up-down direction which is the plate thickness direction. A through hole (not illustrated) through which the bolt 81 is inserted is also formed in the fixing parts 80a and 80b. The boss 73 and the fixing part 80a are stacked and fixed by the bolt 81 and a nut 82. The fixing part 80b is fixed to the vehicle body 10a with the bolt 81.

The boss 74 extends rightward in the vehicle 10 from the side wall 72c. The boss 74 is disposed rearward of the center line CL in the front-rear direction. The center line CL is a virtual line that is substantially parallel to the left-right direction and extends through a front-rear center of the casing 70 (lower case 72) that is the center of the length of the casing in the front-rear direction. The boss 74 is provided closer to the side wall 72b than the center line CL. The boss 74 has a through hole 74a through which the bolt 81 is inserted. The through hole 74a penetrates the boss 74 in the up-down direction which is the plate thickness direction. As illustrated in FIG. 5, the boss 74 is fixed to the vehicle body 10a with the bolt 81. The boss 74 is directly fixed to the vehicle body 10a without a bracket.

The boss 75 extends leftward in the vehicle 10 from the side wall 72d. The boss 75 is disposed rearward of the center line CL in the front-rear direction. The boss 75 is provided at a position closer to the side wall 72b than the boss 74. The boss 75 has a through hole 75a through which the bolt 81 is inserted. The through hole 75a penetrates the boss 75 in the up-down direction which is the plate thickness direction. As illustrated in FIG. 5, the boss 75 is fixed to the vehicle body 10a with the bolt 81. The boss 75 is directly fixed to the vehicle body 10a without a bracket.

The boss 75 is farther from the outside (right side surface) of the vehicle 10 than the boss 74 in the left-right direction. The boss 75 has a smaller area of a cross section orthogonal to the left-right direction, which is the extending direction, than the boss 74. The boss 75 has a width, which is at least a length in the front-rear direction, narrower than that of the boss 74. The boss 75 also has a thickness, which is a length in the up-down direction, smaller than that of the boss 74. The boss 74 corresponds to a second boss, and the boss 75 corresponds to a third boss.

As described above, the casing 70 (PCU 20) can be stably supported with respect to the vehicle body 10a by the bosses 73, 74, and 75 provided on the three side walls 72a, 72c, and 72d. The bosses 73, 74, and 75 may have ribs for reinforcement in parts other than the fastening part (fixing part).

The inclined member 90 is disposed to mitigate shock of the PCU 20 at the time of a side collision. The inclined member 90 is attached to the vehicle body 10a. The inclined member 90 is disposed, for example, between the side member and the PCU 20. As illustrated in FIGS. 3 and 6, the inclined member 90 has an inclined surface 90a. The inclined member 90 has a substantially rectangular shape in top view. A side surface of the inclined member 90 on the side of the left of the vehicle 10, that is, on the side of the PCU 20, is the inclined surface 90a. When attached to the vehicle body 10a, the inclined surface 90a has an inclination in which the distance from the right side surface of the vehicle 10 in the left-right direction is shorter toward the upper side.

In a state where the plurality of bosses 73, 74, and 75 are fixed, a corner 72f forming a boundary between the side wall 72c and the bottom wall 72e in the casing 70 is in contact with the inclined surface 90a. The corner 72f is in contact with an intermediate part of the inclined surface 90a separate from the upper end and the lower end. The contact length between the inclined surface 90a and the corner 72f is set to a length that allows the casing 70 to move on the inclined surface 90a at the time of a side collision. The contact length is preferably ½ or more of the length in the front-rear direction of the casing 70. In the present embodiment, the casing 70 and the inclined member 90 are disposed such that about ⅔ of the length of the casing 70 is in contact with the inclined surface 90a. The inclined member 90 is disposed while avoiding the boss 74.

As described above, the PCU 20 is fixed to the vehicle body 10a. The fixing structure (mounting structure) of the PCU 20 includes the bracket 80 and the inclined member 90 described above. The PCU 20 may further include a cooler (not illustrated). The cooler mainly cools the capacitor module 40 and the semiconductor module 50. The cooler has, for example, a flow path through which a refrigerant flows. The cooler may be disposed inside the casing 70. The cooler may be disposed outside the casing 70 and be fixed to the casing 70 so as to form a stacked body together with the casing 70. The cooler may be formed integrally with the casing 70.

Figure 7:
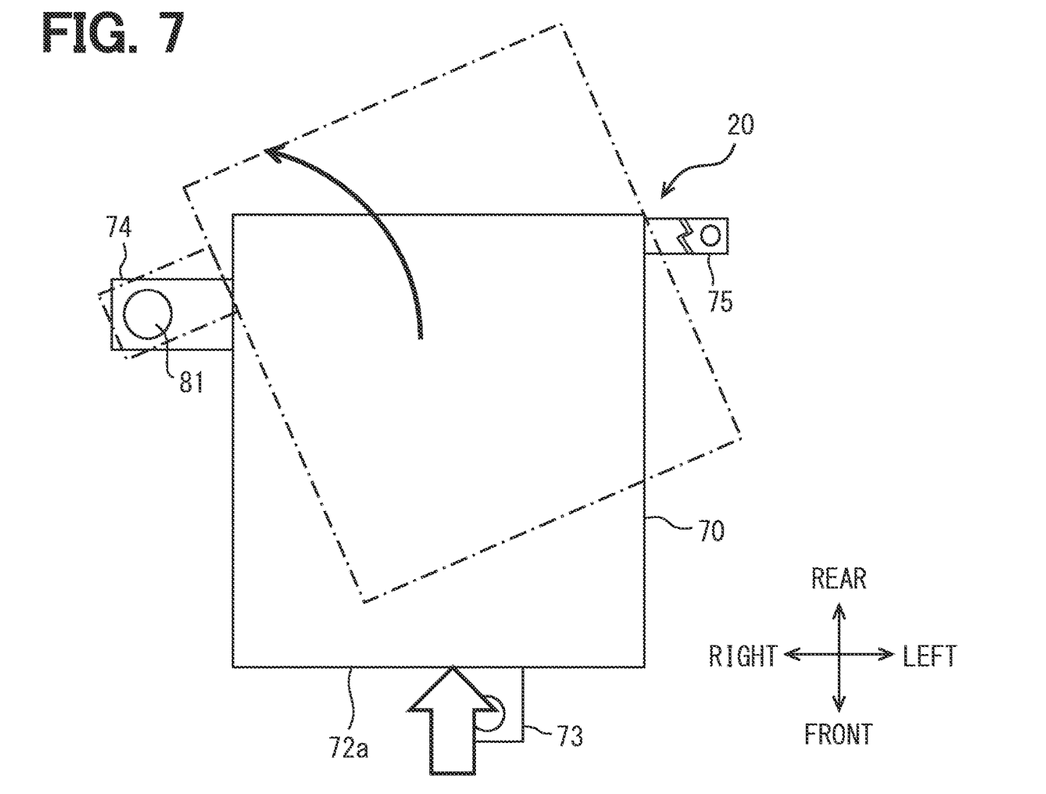
FIG. 7 is a top view illustrating movement of the PCU caused by a frontal collision load.
Figure 8:
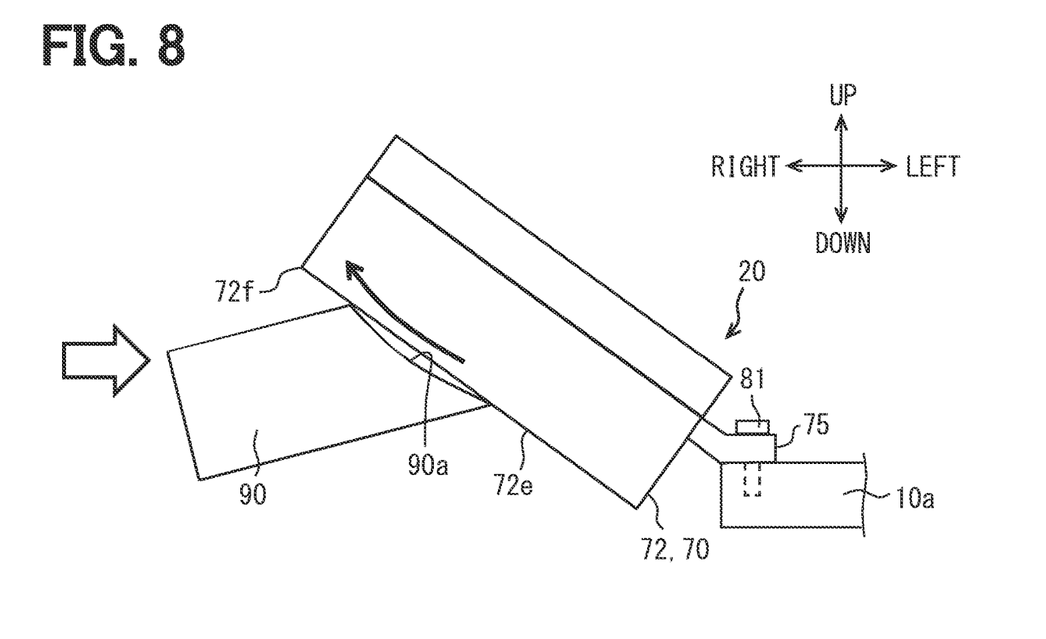
FIG. 8 is a side view illustrating movement of the PCU caused by a side collision load.

FIG. 7 illustrates the movement of the PCU 20 at the time of a frontal collision. An open arrow indicates a load due to a frontal collision, a solid line indicates the PCU 20 before movement, and an alternate long and short dash line indicates the PCU 20 after movement. FIG. 8 illustrates the movement of the PCU 20 at the time of a side collision. An open arrow indicates a load due to the side collision, and FIG. 8 indicates a state after the movement. FIG. 6 illustrates a state before the movement.

As described above, in the present embodiment, the bosses 73 to 75 for fixing the PCU 20 (casing 70) to the vehicle body 10a are provided on the three side walls 72a, 72c, and 72d excluding the side wall 72b on the rear side of the vehicle 10. The rear side wall 72b has no boss. Even if a frontal collision occurs and a collision load indicated by an open arrow in FIG. 7 is applied to the casing 70, since there is no fixing point by a boss on the rear side of the casing 70, the casing 70 moves to the rear side of the vehicle 10. Therefore, shock of the collision can be mitigated. In the configuration in which the PCU 20 is disposed in the front compartment 13, the load due to the frontal collision is a load in a direction from the front side to the rear side.

The cross-sectional area of the boss 75 provided on one side wall 72d in the left-right direction (width direction) is made smaller than the cross-sectional area of the boss 74 provided on the other side wall 72c. Therefore, the boss 75 having a small cross-sectional area breaks (is damaged) as illustrated in FIG. 7 as the casing 70 is moved rearward by the collision load. The collision load acts on the boss 75 in the shearing direction, and the boss 75 breaks. The breakage of the boss 75 releases the fixing structure between the vehicle body 10a and the casing 70 via the boss 75. On the other hand, the boss 74 having a large cross-sectional area does not break, and maintains the fixing structure with the vehicle body 10a. As a result, the casing 70 rotates about an axis in the up-down direction about the fixing point by the boss 74, as indicated by a solid arrow in FIG. 7. As described above, shock can be released by varying the cross-sectional areas (strengths) of the left and right bosses 74 and 75. That is, shock of the collision can be mitigated.

As described above, it is possible to provide the PCU 20 having high performance of mitigating shock caused by a collision, particularly a frontal collision, that is, having a high shock mitigation property.

The position of the boss 74 in the front-rear direction is not limited to the above example. For example, the boss 74 may be provided on the center line CL. In the present embodiment, the entire boss 74 is provided on the rear side of the center line CL. Since the fixing point between the casing 70 and the vehicle body 10a by the boss 74 is on the rear side of the center line CL, the rotational moment with respect to the load at the time of the frontal collision increases. Since the casing 70 is easily rotated, shock of the collision can be effectively mitigated.

The fixing structure between the boss 73 and the vehicle body 10a is not limited to the above example. For example, the boss 73 may be directly fixed to the vehicle body 10a. In the present embodiment, the boss 73 is fixed to the vehicle body 10a via the bracket 80. The bracket 80 breaks or is deformed by a load at the time of a frontal collision. The position of the boss 73 is displaced by the deformation of the bracket 80. As a result, the casing 70 can move backward and rotate about the fixing point of the boss 74.

The arrangement of the bosses 74 and 75 is not limited to the above example if it is sufficient to consider only shock due to a frontal collision. For example, the boss 75 having a small cross-sectional area may be provided on the side wall 72c on the vehicle side surface side, and the boss 74 may be provided on the side wall 72d. In this case, the casing 70 rotates in a direction opposite to that in FIG. 7. In the present embodiment, the PCU 20 is disposed in the vicinity of the right side surface of the vehicle 10. The boss 74 is provided on the side wall 72c closer to the right side surface (outside of vehicle), and the boss 75 is provided on the side wall 72d. As illustrated in FIG. 8, a load due to a side collision is a load in a direction from the right side to the left side of the vehicle 10.

The PCU 20 has a fixing point by the boss 75 on the rear side of the side wall 72c on which the collision load acts. The boss 75 having a small cross-sectional area is bent (distorted) by the collision load. Due to the deformation of the boss 75, shock caused by the side collision can be mitigated. Therefore, the shock mitigation property can be enhanced.

The inclined member 90 may be eliminated. Also in this case, shock due to the side collision can be mitigated by the deformation of the boss 75 described above. In the present embodiment, the inclined member 90 is provided. As described above, in the normal state before the collision (see FIG. 6), the corner 72f of the casing 70 is in contact with the inclined surface 90a. For example, the casing 70 is pushed leftward by a load at the time of a side collision to bend the boss 75 on the far side, and the corner 72f moves upward on the inclined surface 90a. The corner 72f moves so as to slide on the inclined surface 90a. Depending on the collision load, the corner 72f passes the upper end of the inclined surface 90a, and the bottom wall 72e of the casing 70 comes into contact with the upper end and/or the lower end of the inclined surface 90a as illustrated in FIG. 8.

As described above, when the inclined member 90 is provided, the angle of rotation centered on the fixing point of the boss 75 about the axis extending in the front-rear direction can be increased as compared with the configuration in which inclined member 90 is not provided. That is, shock can be released effectively. Therefore, the shock mitigation property against a side collision can be further enhanced.

The collision load may be applied to the casing 70 via the inclined member 90, or may be applied to the casing 70 without the inclined member 90. FIG. 8 illustrates an example in which the collision load is applied via the inclined member 90.

Timing of deformation of the boss 75 and movement of the casing 70 at the time of a side collision is not limited to the above example. For example, due to a load at the time of a side collision, the inclined member 90 moves to the left side, and the inclined surface 90a side rises upward. With the movement of the inclined member 90, the corner 72f moves so as to slide on the inclined surface 90a, and the casing 70 rotates about the axis in the front-rear direction about the fixing point of the boss 75. The boss 75 may be deformed along with this rotation.

Second Embodiment

A second embodiment is a modification based on the preceding embodiment, and the description of the preceding embodiment can be incorporated. In the preceding embodiment, only one corresponding boss 73, 74, and 75 is provided on each of the side walls 72a, 72c, and 72d. Alternatively, a plurality of bosses may be provided.

Figure 9:
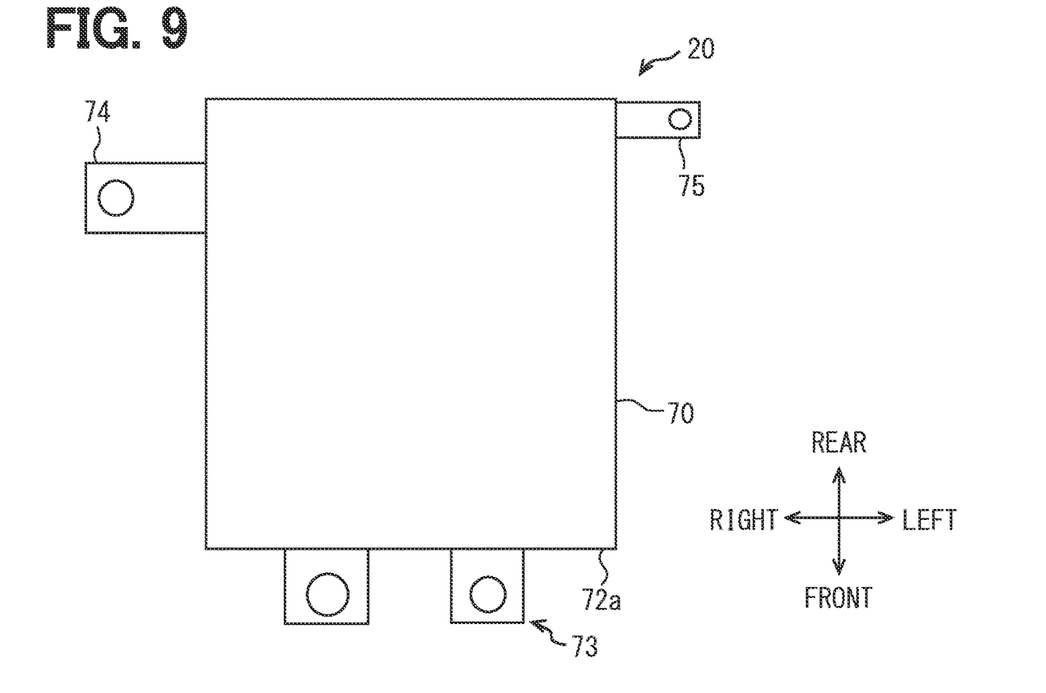
FIG. 9 is a top view illustrating a PCU according to a second embodiment.

FIG. 9 illustrates a PCU 20 of the present embodiment. As illustrated in FIG. 9, the PCU 20 includes two bosses 73 extending from a side wall 72a. The two bosses 73 are provided at positions separated from each other in the left-right direction. One of the bosses 73 is provided to the right with respect to the center of a casing 70 in the left-right direction, and the other boss is provided to the left with respect to the center of the casing 70 in the left-right direction. Other configurations are similar to those described in the preceding embodiment.

By providing the plurality of bosses 73, the number of fixing points with the vehicle body 10a increases. As a result, even when the weight of the PCU 20 is large, it is possible to stably support the casing 70 (PCU 20) with respect to a vehicle body 10a while ensuring a high shock mitigation property.

The number of bosses 73 is not limited to two. The number of bosses 73 may be three or more. Shapes and sizes of the plurality of bosses 73 may be the same or may be different from each other. That is, among the plurality of bosses 73, cross-sectional areas orthogonal to the extending direction may be the same or may be different from each other.

Figure 10:
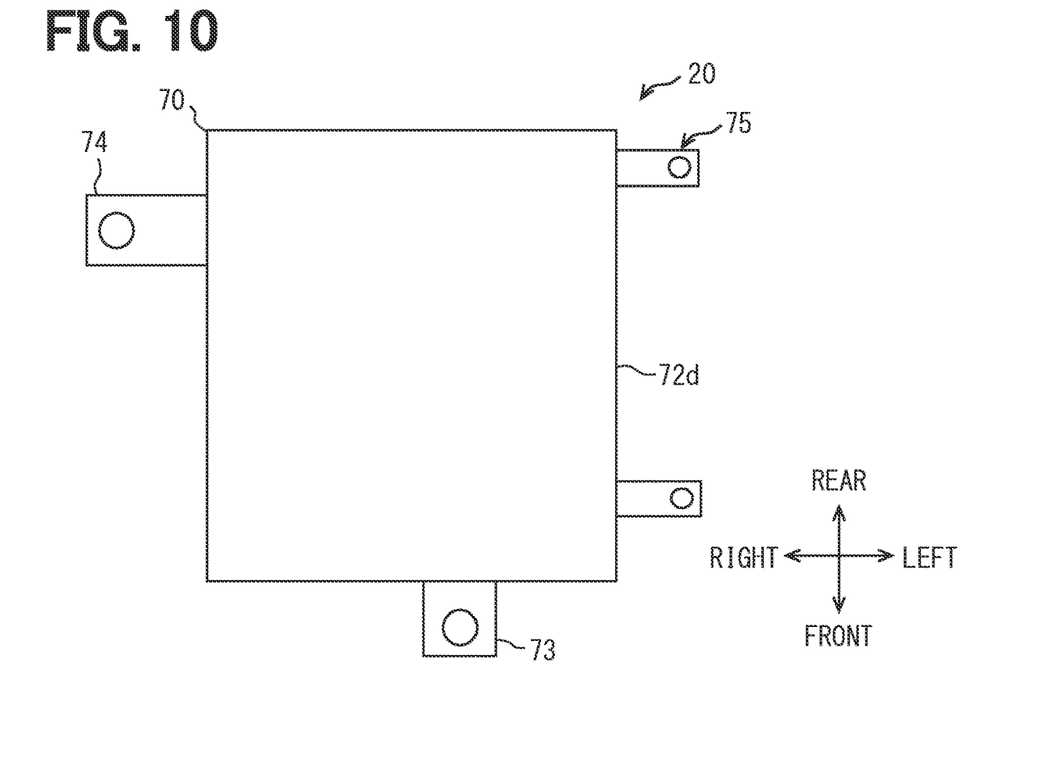
FIG. 10 is a top view illustrating a modification.

As in a modification illustrated in FIG. 10, a PCU 20 may include a plurality of bosses 75. In FIG. 10, two bosses 75 extend from a side wall 72d. The two bosses 75 are provided at positions separated from each other in the front-rear direction. One of the bosses 75 is provided on the rear side of a center line CL (not illustrated), and the other one is provided on the front side of the center line CL. The sum of the cross-sectional areas of the plurality of bosses 75 is smaller than the cross-sectional area of the boss 74. As a result, since the number of fixing points with the vehicle body 10a increases, even when the weight of the PCU 20 is large, it is possible to stably support a casing 70 (PCU 20) with respect to a vehicle body 10a while ensuring a high shock mitigation property.

Needless to say, the configurations illustrated in FIGS. 9 and 10 can be combined with the inclined member 90 described in the preceding embodiment.

The disclosure in the specification, drawings, and the like is not limited to the illustrated embodiments. The disclosure includes the illustrated embodiments and variations based thereon made by those skilled in the art. For example, the disclosure is not limited to the combinations of parts and/or elements shown in the embodiments. The disclosure is feasible by various combinations. The disclosure can have additional parts that can be added to the embodiments. The disclosure includes embodiments in which parts and/or elements of the embodiments are omitted. The disclosure includes the replacement or combination of parts and/or elements between one embodiment and another embodiment. The disclosed technical scope is not limited to the description of the embodiments. The several technical scopes disclosed are indicated by the description of the claims, and should be further understood to include meanings equivalent to the description of the claims and all modifications within the scope.

The disclosure in the specification, the drawings, and the like is not limited by the description of the claims. The disclosure in the specification, the drawings, and the like includes the technical idea described in the claims, and further covers a wider variety of technical ideas than the technical idea described in the claims. Hence, various technical ideas can be extracted from the disclosure of the specification, the drawings, and the like without being bound by the description of the claims.

The control circuit 38 and the drive circuit 39 are provided by a control system including at least one computer. The control system includes at least one processor (hardware processor) that is hardware. The hardware processor can be provided by the following (i), (ii), or (iii).
   (i) The hardware processor may be a hardware logic circuit. In this case, the computer is provided by a digital circuit including a large number of logic units (gate circuits) that are programmed. The digital circuit may include a memory storing a program and/or data. The computer may be provided by an analog circuit. The computer may be provided by a combination of a digital circuit and an analog circuit.
   (ii) The hardware processor may be at least one processor core that executes a program stored in at least one memory. In this case, the computer is provided by at least one memory and at least one processor core. The processor core is referred to as a CPU, for example. The memory is also referred to as a storage medium. The memory is a non-transitory, tangible storage medium that non-transiently stores "a program and/or data" readable by a processor.
   (iii) The hardware processor may be a combination of the above (i) and the above (ii). (i) and (ii) are arranged on different chips or on a common chip.

That is, the means and/or functions provided by the control circuit 38 and the drive circuit 39 can be provided only by only hardware, only software, or a combination thereof.

A switching element forming a power conversion circuit (inverter 31) is not limited to the IGBT 36. For example, a MOSFET may be used.

Although the example in which the vehicle 10 is a left-hand drive vehicle has been described, the present invention is not limited thereto. The present invention can also be applied to a right-hand drive vehicle, that is, a configuration in which a steering wheel 11 is provided on the right side of the vehicle 10. In this case, the arrangement of the transmission 16 and the PCUs 20 and 21 is horizontally reversed with respect to FIG. 1, for example. The PCU 20 is disposed in the vicinity of the partition wall 12 and in the vicinity of the left side surface of the vehicle 10. In such a configuration, in order to mitigate shock caused by a side collision, the boss 74 may be provided on a side wall close to the left side surface, and the boss 75 having a small cross-sectional area may be provided on the opposite side wall. In a case where the inclined member 90 is provided, the inclined member 90 may be disposed between the left side surface and the casing 70.

An example of the front engine rear wheel drive (FR) method has been described, but the present invention is not limited thereto. The present invention is also applicable to a front engine front wheel drive (FF) system and a rear engine rear drive (RR) system. In a case where the power converter is disposed in a rear compartment, a load due to a frontal collision is a load in a direction from the rear side to the front side of the vehicle. An example of the hybrid vehicle has been described as the mobile object, but the mobile object is not limited thereto. The driving system of the hybrid vehicle is not limited to the above example.

The above configuration may be applied to the PCU 21. An example in which the PCUs 20 and 21 are individually configured has been described, but the present invention is not limited thereto. The above-described configuration may be applied to one PCU including the power conversion circuit corresponding to each of the motor generators 18 and 19. The shock mitigating structure can also be applied to a PCU in which power conversion circuits are aggregated.

The arrangement of the capacitor module 40, the semiconductor module 50, the circuit board 60, and the like housed in the casing 70 is not particularly limited. The example in which one semiconductor module 50 is included in the upper and lower arm circuits 34 for one phase has been described, but the present invention is not limited thereto. One arm (34H, 34L) may be formed by one semiconductor module 50. One semiconductor module 50 may form the upper and lower arm circuits 34 for three phases, that is, the entire inverter 31. The PCU 20 (power converter) only needs to include a casing having at least a boss and a semiconductor module housed in the casing.

The boss 75 may have a cross-sectional area smaller than that of the boss 74 by having a notch, a hole, and the like. The thicknesses of the bosses 74 and 75 may be substantially equal to each other.

An example in which the PCU 20 includes the bracket 80 has been described, but the present invention is not limited thereto. The PCU 20 is fixed to the vehicle body 10a via the bracket 80. That is, it is only necessary that the bracket 80 be included in the fixing structure of the PCU 20. The vehicle body 10a side may include the bracket 80. Similarly, an example in which the PCU 20 includes the inclined member 90 has been described, but the present invention is not limited thereto. The corner 72f of the PCU 20 is in contact with the inclined surface 90a of the inclined member 90 attached to the vehicle body 10a. That is, it is only necessary that the inclined member 90 be included in the fixing structure of the PCU 20. The vehicle body 10a side may include the inclined member 90.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A power converter disposed in a housing chamber of a rotating electrical machine in a mobile object and performing power conversion between a battery of the mobile object and the rotating electrical machine, the power converter comprising:
   a semiconductor module forming a circuit for the power conversion;
   a casing having a rectangular shape in top view in an up-down direction of the mobile object and housing the semiconductor module; and
   bosses extending outward, respectively, from three of four side walls of the casing excluding a side wall provided on a side of the casing facing rearward in a front-rear direction of the mobile object orthogonal to the up-down direction, the bosses being fixed to the mobile object, wherein
   the bosses include a first boss provided on a first side wall of the casing facing frontward, a second boss provided on a second side wall of the casing facing in a width direction of the mobile object orthogonal to the up-down direction and the front-rear direction, and a third boss provided on a third side wall of the casing opposite to the second side wall, and
   a cross-sectional area of the third boss perpendicular to an extending direction of the third boss is smaller than a cross-sectional area of the second boss perpendicular to an extending direction of the second boss.

2. The power converter according to claim 1, wherein
a fixing part of the second boss fixed to the mobile object is disposed rearward of a virtual center line that is located at a center of a length of the casing in the front-rear direction.

3. The power converter according to claim 1, further comprising
a bracket interposed between the first boss and the mobile object, wherein
the first boss is fixed to the mobile object via the bracket.

4. The power converter according to claim 1, wherein
a distance between the second side wall and an outside of the mobile object is shorter in the width direction than a distance between the third side wall and the outside of the mobile object.

5. The power converter according to claim 4, further comprising
an inclined member having an inclined surface that is inclined such that a distance from the inclined surface to the outside of the mobile object in the width direction increases upward in the up-down direction, wherein
in a state where the bosses are fixed to the mobile object, a corner between the second side wall and a bottom wall of the casing is in contact with the inclined surface.

\* \* \* \* \*